Aug. 23, 1938.  G. E. MILLER  2,128,010
POWER TRANSMISSION MECHANISM FOR SWINGING CRANE EXCAVATORS OR THE LIKE
Filed Aug. 7, 1937  2 Sheets-Sheet 1

Inventor
George E. Miller

Patented Aug. 23, 1938

2,128,010

UNITED STATES PATENT OFFICE 2,128,010

POWER TRANSMISSION MECHANISM FOR SWINGING CRANE EXCAVATORS OR THE LIKE

George E. Miller, Findlay, Ohio, assignor to The Buckeye Traction Ditcher Company, Findlay, Ohio, a corporation of Ohio Application August 7, 1937, Serial No. 157,939

2 Claims. (Cl. 214—135)

This invention relates to power transmission mechanism of the type adapted for selectively operating a plurality of devices, and is primarily intended for use in connection with swinging crane excavators, wherein power is taken from a common source to perform various operations.

The primary object of the invention is the provision of a mechanism of this character having a novel and compact arrangement of parts, whereby the various operations of the associated machine may be accomplished in an efficient manner.

The invention is fully described in the following specification, and one embodiment thereof illustrated in the accompanying drawings, in which—

Figure 1:
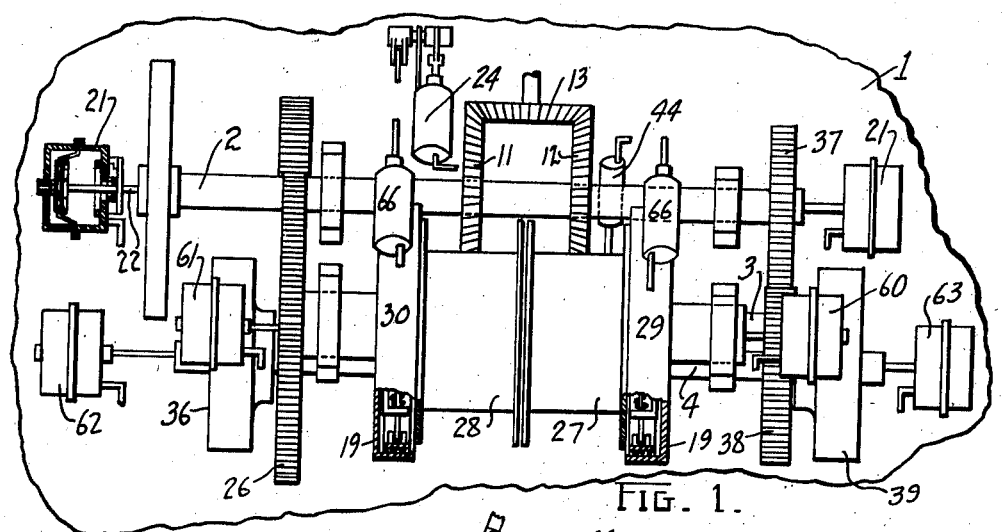
Figure 2:
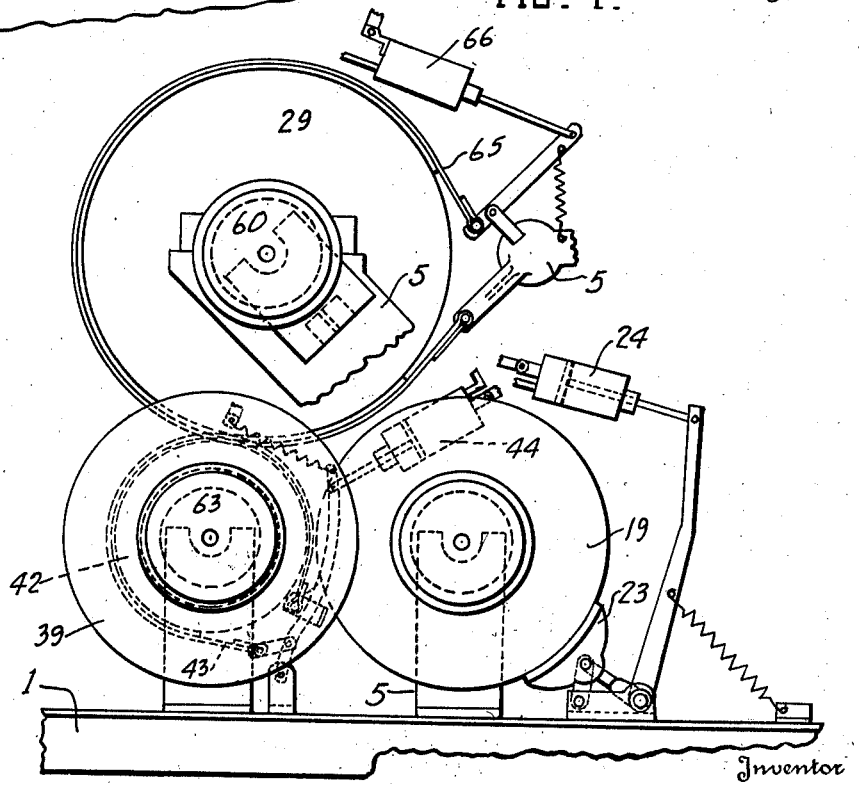
Figure 3:
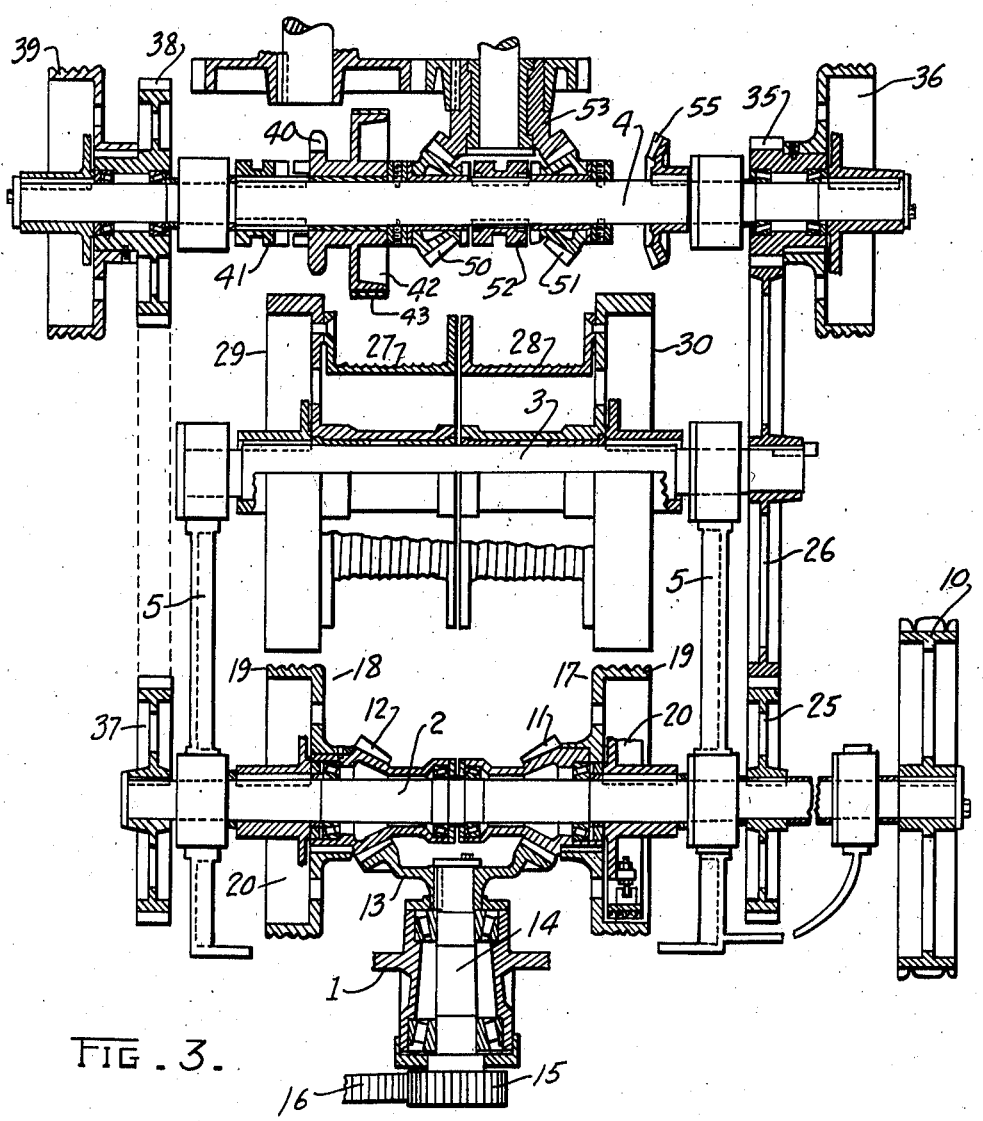

Figure 1 is a plan more or less in diagram of the mechanism embodying the invention, with parts broken away; Fig. 2 is an end elevation thereof more or less in diagram, and with parts broken away, and Fig. 3 is a layout view of the mechanism, with parts spread out to dispose the various shafts in a common plane and with parts in section.

Referring to the drawings, 1 designates a swing platform such as the platform of a cab of a swinging crane excavator and on which the power mechanism embodying the invention is mounted. This mechanism includes a swing shaft 2 which is geared to impart swinging movements to the platform relative to the tractor means on which mounted; a drum shaft 3 on which one or more separately controlled drums may be mounted and a crowd and propel shaft 4. These shafts are disposed in spaced parallel relation and are journaled in suitable bearings provided in a frame 5 mounted on the platform. Power for driving these shafts is obtained from a motor or other suitable power source (not shown), which is mounted on the platform, as well understood in the art, and has driving connection with the swing shaft 2 in any suitable manner as through a chain engaging a sprocket 10 on an end of such shaft.

The swing shaft 2, which is the primary shaft of the set, carries two loose bevel gears 11 and 12, which are in separate clutch controlled connection with the shaft and are in mesh with a driven bevel pinion 13 on a vertical countershaft 14 (Fig. 3), which extends down through a bearing in the platform 1 and carries at its lower end a pinion 15 in mesh with an annular rack 16. The rack 16, as well understood in the art, is concentric to the swinging pivot of the platform, and a driving of the shaft 14 from one drive gear or the other will cause the pinion 15 to travel around the rack and impart rotation in one direction or the other to the platform. Each clutch 17, 18, includes a combined clutch and brake drum member 19 in fixed engagement with the respective gear 11, 12, and within the drum includes a suitable clutch mechanism 20 which, in the present instance, is actuated to have clutch engagement with the drum when the diaphragm in a respective chamber 21 is actuated by vacuum action within the cylinder to move an associated push rod 22 inward to apply the clutch. The invention is not restricted to the use of any particular form of clutch operating means therefor and need not, therefore, be more specifically described. One only of the drum members 19 is acted on by a brake 23 normally actuated to engage the drum by vacuum action in a brake cylinder 24.

The drum shaft 3 is driven from the swing shaft 2 by a pair of meshing gears 25 and 26 fixed thereto, and, in the present instance, carries two cable winding drums 27 and 28 adapted to have driven connection with the shaft 3 through respective clutches 29 and 30, the combined brake and clutch drum of which is connected to the shaft through a suitable clutch means controlled by vacuum action the same as in the case of the clutches of the shaft 2. If the machine is of the convertible type for use either in connection with a dipper or clam shell type bucket, the two drums 27 and 28 are employed, the drum 27, in the present instance, carrying the hoist cable adapted for connection to the dipper, and the other drum, commonly referred to as the clam drum, carrying the cable for supporting the clam shell bucket.

The crowd and propel shaft 4 is driven at one speed from the drum shaft gear 26 through a pinion 35 and clutch 36 disposed at one end of the shaft, and at another speed from the swing shaft 2 through gears 37 and 38 and a clutch 39 at the opposite end of the shaft, the gear 37 being fixed to the shaft 2. Each pinion 35 and 38 is loose on the shaft 4 together with the drum member of the respective clutch, and is connected to the shaft by an engagement of the clutch, which latter may be effected in the same manner as in the case of the other clutches.

The shovel crowd element 40, in the present instance a sprocket wheel, is loose on the shaft 4 and clutch 41 is feathered to the shaft for shifting movements into and out of engagement with the sprocket, as well understood in the art. A shovel crowd brake is connected to the sprocket 40 and includes a drum 42 fixedly connected to the sprocket and a brake band 43 (Fig. 2), which is actuated to engage the brake drum by vacuum action within the brake cylinder 44. It is understood in the art that the element 40 is in chain and sprocket wheel connection with a pinion carried by the customary machine crane and engaging a rack bar on the shovel stick and operable to impart crowding or retracting movements to the stick and shovel. The crowd element 40 may be slowly driven for crowding action by engagement of the slow speed clutch 39 with the shaft 4, or it may be rapidly driven in reverse direction to effect a rapid retraction of the shovel by an engagement of the high speed clutch 36 with the shaft 4.

Two opposed bevel pinions 50 and 51 are loosely mounted on the shaft 4 and adapted to be alternately engaged therewith by a clutch collar 52 feathered on the shaft therebetween and shiftable into clutch engagement with either. Power is taken off from these pinions to a suitable propelling means for the machine through a common bevel pinion 53 and connected means. Power for hoisting the associated machine boom may be taken from a pinion 55 on shaft 4.

Referring particularly to Figs. 1 and 2, 60 and 61 designate the diaphragm chambers, through the medium of which clutches 29 and 30, respectively, are actuated, and 62 and 63 designate like chambers, respectively, for the clutches 36 and 39 on the propel shaft 4. Each clutch drum 29, 30, is engaged by a respective brake band 65, which has connection with and is actuated by the presence of vacuum action in an associated brake cylinder 66, as well understood in the art.

It is apparent from the foregoing that power is imparted primarily to the swing shaft 2 from any suitable source, and from it through the gears 25, 26, to the drum shaft 3 and to the crowd and propel shaft 4 at one speed through the train of gears 25, 26 and 35, and an associated clutch 36, while the shaft 4 is driven at another speed from the shaft 2 through the gears 37 and 38 and associated clutch 39. A swing movement is imparted in one direction or the other to the associated platform or crane cab from the shaft 2 by releasing the brake 23 and engaging one or the other of the clutches 19, which effects a driving of the vertical rack pinion shaft 14 through one or the other of the bevel gears 11, 12. Either clutch 29, 30, on the drum shaft 3 may be released to permit a paying out of the shovel or clam shell bucket under the weight of its load, and either drum may be operated to effect a hoisting of the associated shovel or bucket by an engagement of the associated clutch 29 or 30. Two different speeds for either propelling or hoisting work or both may be imparted to the shaft 4 by engagement of either clutch 36, 39, and a shovel crowding action may be effected by an engagement of the element 40 with the shaft, while a propelling action in one direction or the other is effected by an engagement of the clutch 52 with either of the companion bevel pinions 50, 51.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a power transmission mechanism for swinging crane excavators or the like, a swingable mount, a swing shaft, a drum shaft, and a crowd and propel shaft supported in spaced parallel relation on said mount, clutch controlled power transmission means directly connecting one of the adjacent ends of each of the swing shaft and the crowd and propel shaft together for driving the latter at a predetermined low speed from said swing shaft, power transmission means carried by one end of the drum shaft having direct operative engagement with the adjacent opposite end of the swing shaft and clutch controlled connection with the adjacent opposite end of the crowd and propel shaft whereby the drum shaft is directly and constantly driven from the swing shaft, and the crowd and propel shaft is indirectly driven by the swing shaft through the drum shaft, and power means directly connected to the swing shaft.

2. In a power transmission mechanism for swinging crane excavators or the like, a swingable mount, a swing shaft, a drum shaft, and a crowd and propel shaft supported in spaced parallel relation on said mount, a hoist drum loose on said drum shaft and having clutch controlled connection therewith, power transmission means directly connecting the swing shaft and drum shaft for constantly actuating the latter, a clutch controlled means carried by the crowd and propel shaft in operative engagement with said power transmission means, a second power transmission means controllably connecting the swing shaft, and the crowd and propel shaft independently of the first-named power transmission means, and power means connected to the swing shaft.

GEORGE E. MILLER.